Jan. 29, 1935.  H. ROHRDANTZ  1,989,114
TRAFFIC INDICATOR
Filed June 3, 1932  4 Sheets-Sheet 1
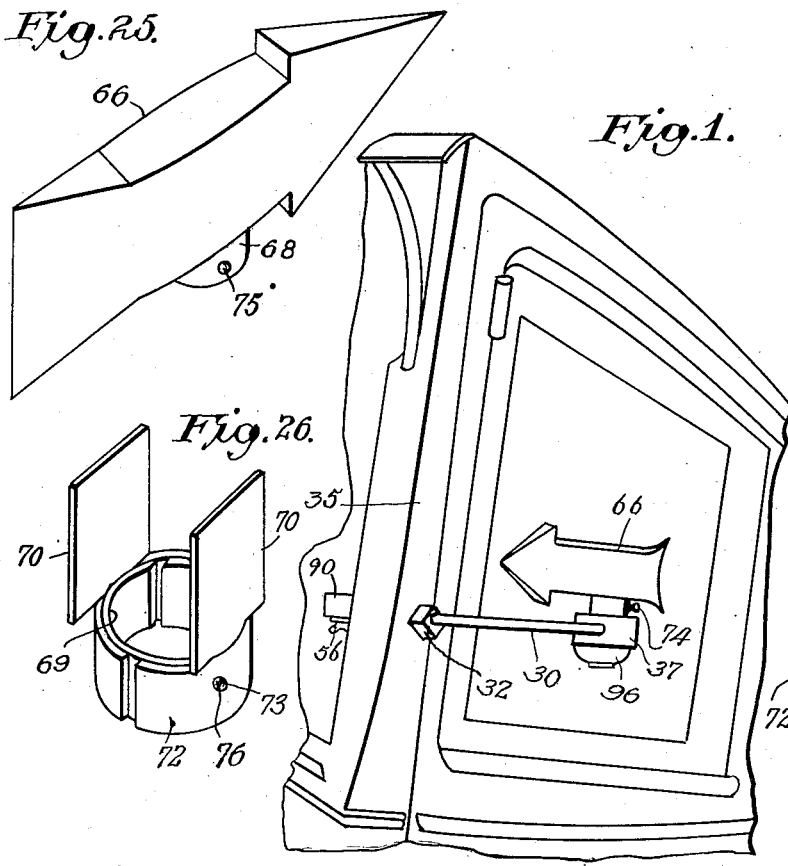
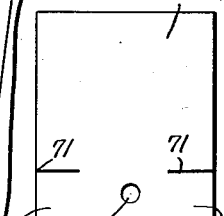
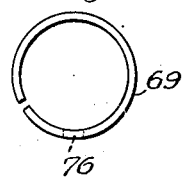
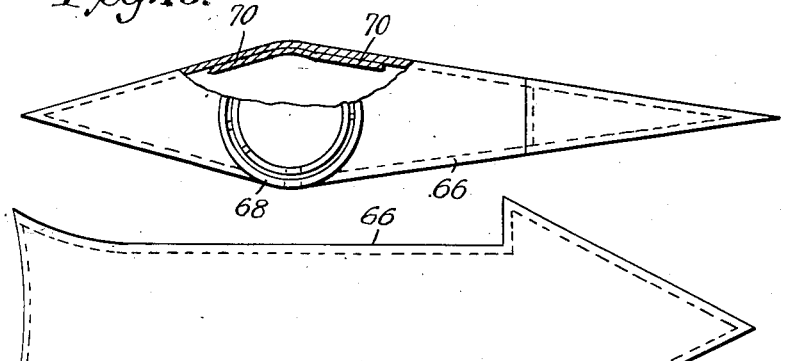
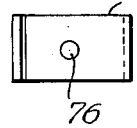
Inventor
Henry Rohrdantz Jan. 29, 1935.  H. ROHRDANTZ  1,989,114
TRAFFIC INDICATOR
Filed June 3, 1932  4 Sheets-Sheet 2
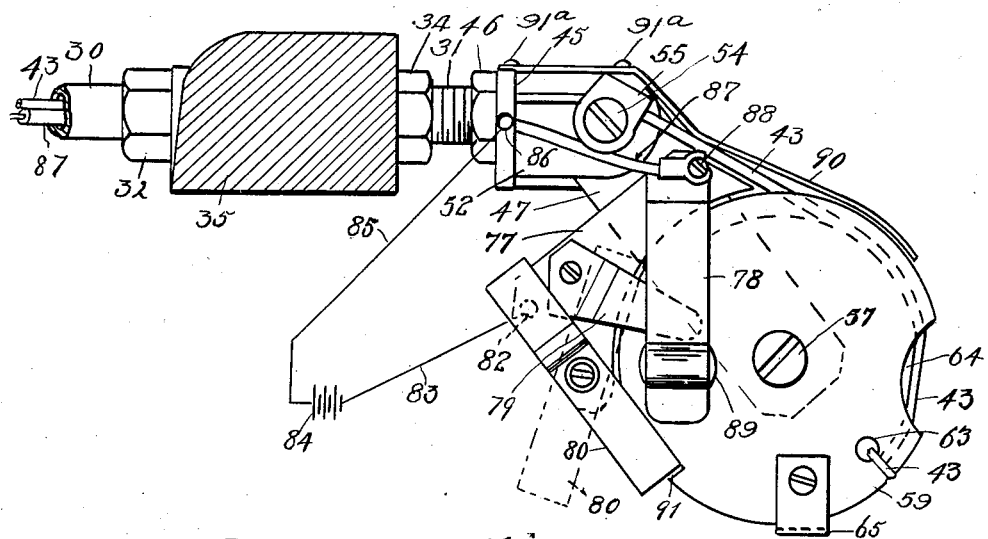
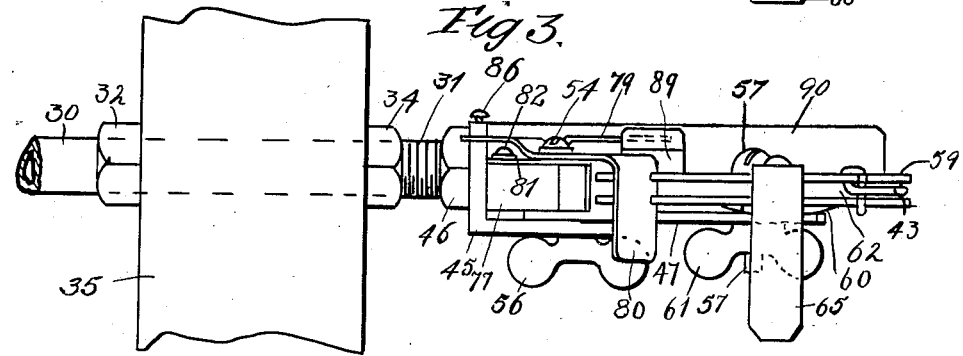
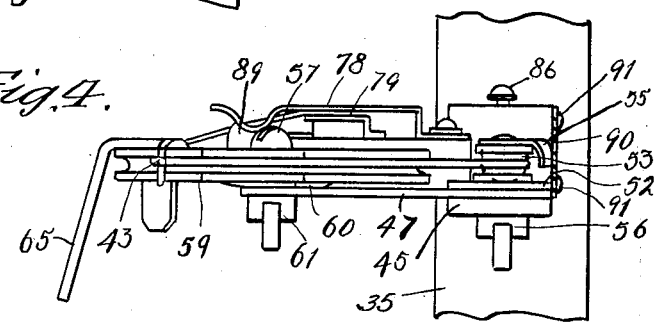
Inventor
Henry Rohrdantz
By W. W. Williamson

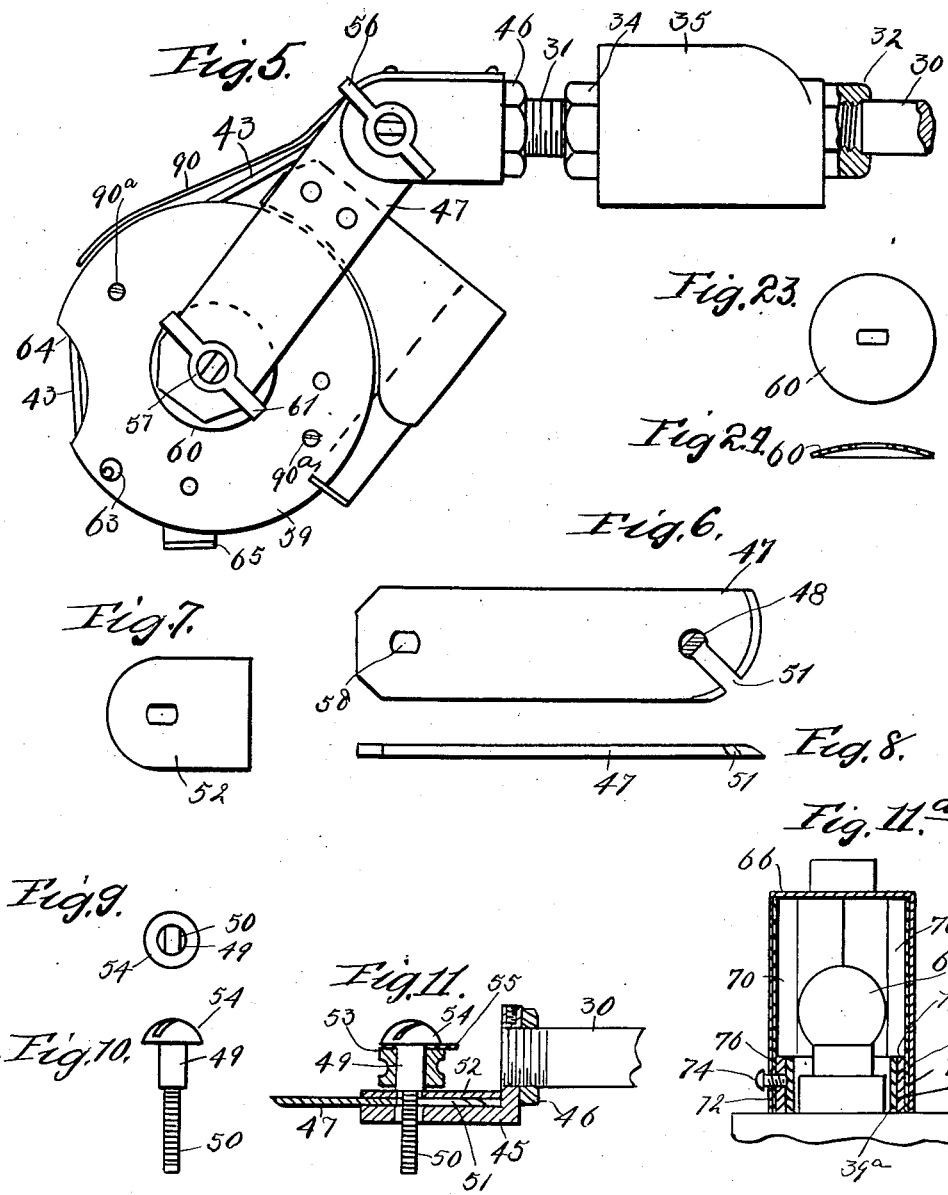

Jan. 29, 1935. H. ROHRDANTZ 1,989,114
TRAFFIC INDICATOR
Filed June 3, 1932 4 Sheets-Sheet 4
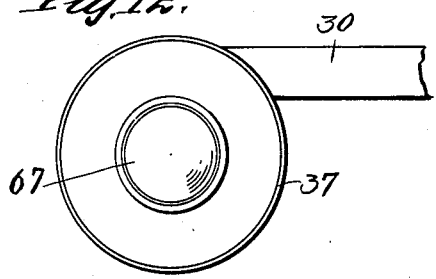
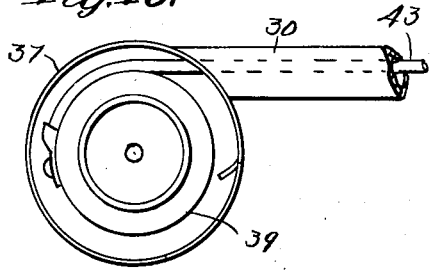
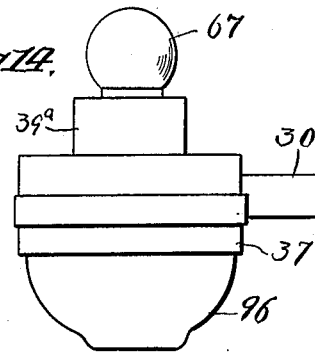
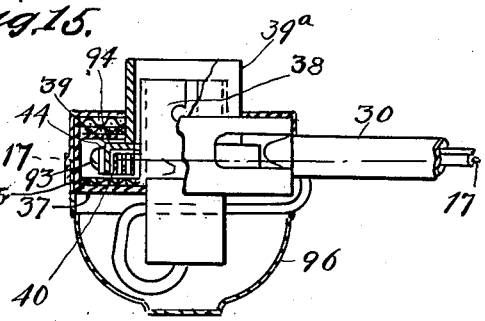
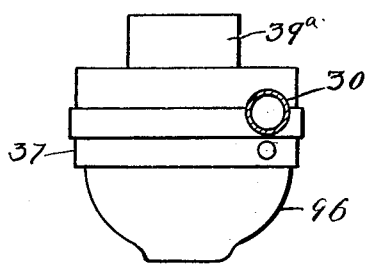
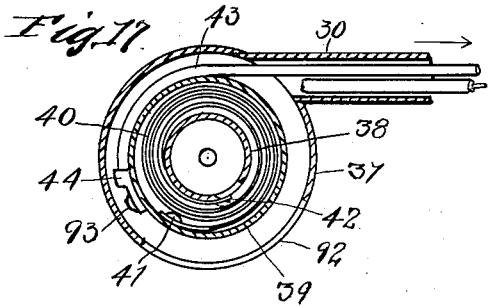
Inventor
Henry Rohrdantz
By W. W. Williamson
Atty Patented Jan. 29, 1935

1,989,114

UNITED STATES PATENT OFFICE 1,989,114

TRAFFIC INDICATOR

Henry Rohrdantz, Philadelphia, Pa.

Application June 3, 1932, Serial No. 615,116

7 Claims. (Cl. 116—49)

My invention relates to new and useful improvements in traffic indicators for motor vehicles, and has for one of its objects to provide an exceedingly simple and effective device of this description which will enable the driver of a car to readily indicate to pedestrians and to the drivers of other cars the direction in which he intends turning or whether or not he intends to continue straight ahead.

A further object of the invention is to so construct the mechanism of such a device that it will be simple, durable and inexpensive and the parts thereof be readily removed and others substituted therefor.

With these and other ends in view, this invention consists in the details of construction and combination of elements hereinafter set forth and then specifically designated by the claims.

In order that those skilled in the art to which this invention appertains may understand how to make and use the same, I will describe its construction in detail referring by numerals to the accompanying drawings forming a part of this application, in which:—

Fig. 1 illustrates my improved traffic signal installed upon a motor vehicle.

Fig. 2 is a plan view of the operating mechanism including the supporting rod showing the manner of attaching said rod to the frame of the vehicle.

Fig. 3 is an edge view of Fig. 2.

Fig. 4 is an end view of Fig. 2.

Fig. 5 is a bottom plan view of Fig. 2.

Fig. 6 is a detail plan view of the swinging arm and pivot bolt.

Fig. 7 is a detail plan view of the washer plate for contacting with the swinging arm.

Fig. 8 is an edge view of Fig. 6.

Fig. 9 is an end view of the pivot post.

Fig. 10 is a side view of the pivot post.

Fig. 11 is a detail section of the bracket to which the swinging arm is pivoted showing the guide roller journalled thereon.

Fig. 11a is a side elevation of a portion of the casing, the lamp socket and the lamp showing the spring drum extension and the arrow in section.

Fig. 12 is a detail plan view of the head on which the lamp and indicating arrow are mounted, the arrow being omitted.

Fig. 13 is a view similar to Fig. 12, the cap being removed to show the spring actuated drum and the operating cord attached thereto.

Fig. 14 is an elevation of Fig. 12.

Fig. 15 is a view similar to Fig. 14, sectioned so as to show the operating mechanism within the head.

Fig. 16 is an elevation of the head taken at right angles to Fig. 14.

Fig. 17 is a section on the line 17—17 of Fig. 15.

Fig. 18 is a bottom plan view of the indicating arrow partly broken away to show one of the celluloid sheets for causing the rays from the lamp carried by the head to show red on the outside of the arrow.

Fig. 19 is a side elevation of the indicating arrow.

Fig. 20 is a detail of the clamp ring for holding the colored sheets in place.

Fig. 21 is an elevation of Fig. 20.

Fig. 22 is a detail face view of one of the celluloid sheets for giving forth a colored light from the arrow.

Fig. 23 is a plan view of the friction washer.

Fig. 24 is a section of Fig. 23.

Fig. 25 is a perspective of the arrow.

Fig. 26 is a perspective of the wings in position upon the split collar.

In carrying out my invention as herein embodied, 30 represents a supporting rod which is threaded at 31 to receive the shoulder nut 32 and these threads also receive the holding nut 34, and this rod is passed through a suitable hole in the post 35 of the automobile so that its inner end is within the body of the machine while the outer end projects outside of said body, being firmly held in place by the nuts 32 and 34 as will be readily understood.

The outer end of the rod carries a head 37 in the center of which is secured a lamp socket 38 which also serves as a post and upon this post the drum 39 is fitted to revolve, said drum having a coil spring 40 of the form of a clock spring housed therein, one end of said spring being attached as at 41 to the inner surface of the drum, while the opposite end of the spring is attached as at 42 to the post.

Said drum also has a flexible cord 43 attached as at 44 to its outer surface in such manner as to be coiled thereon by the action of the spring so that when said cord is pulled in the direction of the arrow adjacent thereto, the drum will be revolved against the action of the spring for the purpose hereinafter set forth.

On the inner end of the supporting rod 30 is secured the bracket 45 by being threaded upon this end of the rod and having the jam nut 46 screwed tightly there-against, and to this bracket is pivoted the swinging arm 47, said arm having a hole 48 through which the shank of the pivoting bolt 49 passes, said bolt being slabbed as indicated at 50 so that the arm may be withdrawn therefrom by turning said arm to the proper position to cause the slot 51 to coincide with the minor diameter of the bolt 49. The body of the bolt 49 is of greater diameter than the shank in order that it may seat upon the washer plate 52 and the guide pulley 53 is journalled upon said body. The head 54 of the bolt confines the pulley in place. Between the head 54 and the pulley is positioned a guide plate 55 which is bent downward to prevent the cord 43, which passes around said guide pulley, from being displaced.

56 is a thumb nut run upon the threaded shank of the bolt 49 for clamping the washer plate 52 upon the upper surface of the swinging arm and thus holding said swinging arm in any desired tension between said plate 52 and the bracket.

57 represents a pivoting bolt similar to the bolt 49 and the flattened shank of this bolt passes through the elongated hole 58 in the outer end of the swinging arm 47 to hold the bolt from turning, and on the body of this bolt is journalled the disc wheel 59, a dish shaped washer 60 being interposed between the under surface of the wheel and the arm to exert a friction tension upon the wheel while a thumb nut 61 is run upon the threaded end of the bolt so as to hold these parts in position and to vary the pressure upon the wheel so as to increase or decrease the friction under which said wheel must turn for the purpose hereinafter set forth.

The periphery of the wheel is grooved as indicated at 62 for the reception of that portion of the cord 43 which passes partially around the wheel. This cord is attached to the wheel by the inner end thereof being passed through the hole 63, then carried about a portion of the wheel rim and drawn beneath itself as indicated in Figs. 2 and 3, thus making a slip knot which lends itself to the ready adjustment of the cord to take up the slack therein, and to facilitate this adjustment a portion of the disc wheel is cut away as indicated at 64.

65 is a handle secured to the disc wheel and projecting into easy reach of the driver in order that said wheel may be readily turned in either direction.

66 represents the direction indicating arrow which I prefer to make entirely of translucent celluloid and this arrow is of sufficient proportions to house the electric lamp 67, the shank of said lamp being adapted to fit and lock into the socket 38 in the usual manner and the arrow 66 has a hollow hub 68 formed therewith.

It is preferable that the arrow be amber or some similar color and that a portion of each side thereof have applied thereto a sheet of colored celluloid, and to accomplish the latter in a convenient and effective manner, a split metal collar 69 is utilized for insertion within the hollow hub 68. 70 represents a sheet of thin colored celluloid, usually red, split as indicated at 71, so as to form the wings 72 and also having a hole 73 formed in the lower portion thereof. For the purpose here intended, two of these sheets are utilized and by flexing the sheets into a sufficient curve to pass through the hollow hub 68 they may be inserted within the arrow and positioned against the sides thereof so that the wings will lie within the hub and conform to the interior curvature of the latter, while the upper portion of each of the sheets will conform to the curvature of the inner surface of the sides of the arrow as clearly shown in Figs. 18 and 26. After this has been accomplished, the split ring is inserted within the hub to hold the wings in position and this assemblage is then placed over the extension 39a of the drum 39, the split ring fitting snugly around said extension. The arrow is held in proper position upon the extension 39a by the screw 74 passing through the hole 75 formed in the hub 68 and through the threaded hole 76 formed in the split collar 69 and finally by this screw being set against the extension with sufficient force to prevent the accidental displacement of the parts as will be readily understood.

A block 77 of insulating material is mounted upon the swinging arm 47 and has secured thereto the movable member 78 of an automatic electric switch and also the stationary member 79 of said switch, the movable member being of spring metal and normally bearing upon the upper surface of this stationary member as clearly shown in Fig. 2.

80 is a manually operated switch pivoted to the block 77 and is connected by the conductor plate 81 to the terminal 82 to which the feed wire 83 is connected, said feed wire forming one leg of the circuit leading from the battery 84, while the other leg 85 of said circuit is connected to the terminal 86 in electrical communication with the metallic parts of the device forming the electric return from the lamp according to standard practice, and 87 represents the wire which leads to the lamp socket and forms the other side of the lamp circuit, and this last named wire is attached to the terminal 88 thereby putting it into electric communication with the movable switch member 78.

By this arrangement when the manually operated switch 80 is turned to the position causing it to contact with the stationary member 79 of the automatic switch, the lamp circuit will be closed so as to light the lamp.

On the upper surface of the disc wheel 59 is mounted a cam block 89 and when said wheel is turned to its normal or central position this block rides under the outer end of the movable member 78 of the automatic switch and thereby lifts this member out of contact with the stationary member 79 as clearly shown in Fig. 4, and in order that the person turning the disc wheel may by feeling be made aware when the wheel has reached its central position the upper surface of the cam block is concave so as to receive the curved portion of the movable member 78, thus allowing this curved portion of the movable member to snap into this concave portion when the wheel reaches its central position.

When the disc wheel is in the central position just described, the flexible cord 43 will be holding the spring actuated drum in such position to cause the arrow to point straight ahead in the direction of the travel of the automobile. The turning of the disc wheel in either direction from this central position will cause the arrow to be turned so as to point either to the right or left as the case may be. This result is produced for the reason that the drum 39 on which the arrow is mounted turns in unison with the disc wheel due to the pull of the flexible cord and the counter pull of the coil spring 40.

The rotation of the disc wheel is limited by the stops 90a projecting down from the under surface of said wheel and adapted to contact with the edges of the swinging arm 47.

From the foregoing description, the operation of my improved traffic indicator installed upon an automobile as illustrated in Fig. 1, will be obviously as follows:—The disc wheel being set in its normal or central position will as before described cause the arrow to point in the direction of the travel of the machine at which time the lamp circuit will be open due to the cam block lifting the movable member 78 out of contact with the stationary member 79, the engagement of the curved portion of this movable member with the concave surface of the cam block serving to lock the wheel in this central position so that without any attention on the part of the driver the arrow will remain in this position.

Should it be desired to close the lamp circuit for lighting the lamp while the parts are in the position just above described, it is only necessary to turn the manually operated switch until its inner end contacts with the movable member 78 which position of the manually operated switch is shown in dotted lines in Fig. 2.

This arrangement for lighting the lamp while the arrow is pointing forward is for the purpose of illuminating said arrow while the machine is parked, and at other desired times.

When the driver intends to turn to the right or left, the disc wheel is turned in a corresponding direction which also turns the arrow in a corresponding direction causing it to point at right angles to the travel of the machine either to the right or to the left as determined by the direction in which the disc wheel was turned.

When the arrow is turned crosswise of the line of travel by the revolving of the disc wheel, the cam lug 89 will be moved from under the movable member 78 of the automatic switch and thus permit said member to spring downward into contact with the stationary member 79 of said switch, thus closing the lamp circuit so long as the manually operated switch is contacting with said stationary member. This will cause a colored light to show rearward of the machine as well as forward thereof for observation to oncoming traffic and pedestrians since the rays of light passing through the colored sheets 70 will accomplish this result and warn such oncoming traffic that the machine is turning in the indicated direction.

The manually operated switch may be held out of action by the down turned end thereof being forced into the slot 91 formed in the periphery of the disc wheel and also locking the wheel against accidental rotation.

By pivoting the swinging arm 47 to the bracket 45 and journalling the guide pulley 53 upon the pivoting stud the swinging arm may be adjusted to any desired position to bring the operating handle 65 in the most convenient position for the driver without materially changing the position of the flexible cord 43, and the slot 51 in this arm facilitates the assembling of the device.

From the foregoing it will be evident that my present improved traffic indicator provides an exceedingly simple, effective, compact and easily operated device which may be readily installed on various types of motor vehicles for warning pedestrians and the operators of other vehicles comprising surrounding traffic of the intentions of the operator of the vehicle provided with such a device, as regards to the direction in which he intends to guide his vehicle.

90 represents a guard strip one end of which is secured to the bracket 45 by the screws 91a and this strip serves to prevent the cord 43 from being displaced.

A slot 92 is formed in the head 37 to give access to the screw 93 which holds the clip 44 to the drum 39. The felt washers 94 and 95 are interposed between the top and bottom of the head and the drum to give a soft friction as retarding to the rotations of said drum. 96 is a cap fitted to the head 37 and enclosing the parts projecting downward from said head.

Of course I do not wish to be limited to the exact details of construction as herein shown, as these may be varied within the limits of the appended claims without departing from the spirit of my invention.

Having thus fully described my invention, what I claim as new and useful is:—

1. A traffic indicator comprising a support rod, means for securing said rod to the body of a motor vehicle, a spring actuated drum carried by the outer end of the rod and adapted to operate an indicator, a cord attached to said drum and adapted to be wound thereon by the action of the spring, a swinging arm carried by the inner end of the rod, and a disc wheel journalled upon said arm and having the inner end of the cord attached thereto in such manner that the revolving of said disc wheel will cause the cord to revolve the drum against the action of the spring.

2. In a device of the character described, a support rod, means for securing said rod to the frame of a vehicle, a head carried upon the outer end of said rod, a post secured within the head so as to be stationary therewith, said post serving as a lamp socket, a drum revolvably mounted upon said post and adapted to operate an indicator, a coil spring, one end of which is attached to the post, the other end being attached to the drum to revolve said drum in one direction, a cord attached to the drum so as to be wound thereon by the action of the spring, a bracket attached to the inner end of the support rod, a swinging arm pivoted to said bracket, means for adjusting said arm in various positions, a disc wheel journalled upon the free end of the arm, said wheel having a groove in the periphery thereof for the reception of the cord which latter passes from the drum through the rod, and a guide pulley journalled upon the center of the pivot point of the arm for guiding the cord to the disc wheel.

3. In a device of the character described, a support rod, means for securing said rod to a frame of a vehicle, said rod being hollow, a bracket attached to the inner end of the rod, a bolt passing through a hole in said bracket, an arm having a hole in one end thereof through which said bolt passes the last named hole having a slot therefrom, a friction washer plate through which said bolt also passes, said plate being superimposed upon the arm, a guide pulley mounted upon the upper portion of said bolt, a thumb nut for binding the washer against the arm to hold the latter in any adjustment, a disc wheel pivoted to the outer end of the arm, means for limiting the rotation of said wheel, a head carried by the outer end of the support rod, a post secured in said head, said post serving as a lamp socket, a drum revolvably mounted upon said post and adapted to operate an indicator, a coil spring attached to said post and to said drum to revolve the latter in one direction, and a cord secured to the drum so as to be wound upon the outer surface thereof by the action of the spring, said cord passing through the hollow support rod around the guide pulley, passing into a groove in the periphery of the wheel and having its inner end secured to said wheel.

4. In a device of the kind described, a supporting rod, a head on one end of said rod, a lamp socket in the axis of said head, a drum fitted to rotate about said lamp socket and adapted to operate an indicator, a spring to rotate said drum in one direction, means to be actuated manually to rotate said drum in the opposite direction, said lamp socket projecting below the head, and a cap attached to the lower part of the head and enclosing the element depending below said head.

5. In a device of the kind described, a supporting rod adapted to be mounted at or near one end on a suitable part of an automobile leaving the other end free and projecting outside of the automobile, a head on said free end of the rod, means in the axis of said head adapted to receive an electric light bulb, a drum rotatably mounted on said means within the head, an extension carried by said drum and surrounding said means, said extension adapted to carry an indicator for movement therewith, a spring within the drum and having one end connected thereto and the other end connected to the means about which said drum rotates, said spring tending to rotate the drum in one direction, flexible means attached to the outside of the drum and adapted to be coiled thereon whereby movement of said flexible means in one direction will rotate the drum against the action of the spring and wind the latter, and a cap attached to the lower part of the head for enclosing the bottom thereof.

6. The structure set forth in claim 5, in combination with felt washers interposed between the top and bottom of the head and the drum to provide a soft frictional retarding action to the drum and to exclude dust and other foreign matter.

7. In a device of the kind described, a supporting rod, an arm associated with one end thereof, a head on the opposite end of said rod, a rotatable drum in said head adapted to carry an indicator, a spring to rotate said drum in one direction, a disc wheel pivoted to the arm, flexible means attached to said wheel and to the drum whereby rotation of the wheel in one direction will rotate the drum against the action of the spring, a cam lug projecting from a face of the disc wheel, and a spring member having one end secured in a fixed position with the free end in the path of travel of the cam lug, said free end of said member having a socket for the reception of the cam lug.

HENRY ROHRDANTZ.